Patented Mar. 13, 1951

2,544,771

UNITED STATES PATENT OFFICE 2,544,771

COPPER-CHROMIUM HYDROGENATION CATALYST

Donald M. Young, Frank G. Young, Jr., and Howard R. Guest, Charleston, W. Va., assignors, by mesne assignments to Union Carbide and Carbon Corporation, a corporation of New York No Drawing. Application October 14, 1943, Serial No. 506,214

2 Claims. (Cl. 252—467)

This invention is concerned with an improved copper-chromium catalyst in which the proportion of chromium to copper, calculated on a metal basis, is from 7 to 25 parts of chromium per 100 parts of copper and a method of preparing the catalyst.

The catalyst may conveniently be prepared by roasting a mixture of the carbonates of copper and chromium to convert them to the oxides. Usually a temperature of about 300° C. maintained for a period of about 20 to 60 minutes is sufficient for this purpose. The reaction proceeds smoothly, in contrast to the strongly exothermic decomposition accompanying the preparation of some catalysts heretofore proposed, and may be carried out readily on a commercial scale.

In preparing the catalyst, a mixture of copper and chromium carbonates and basic carbonates suitable for roasting may be obtained, if desired, by precipitating the carbonates from an aqueous solution of the metals in the form of such soluble salts as the nitrates, for instance. The precipitating agent may be an aqueous solution of a soluble carbonate, for example, ammonium carbonate, and this procedure has the advantage that the remaining salts formed by the metathesis are water-soluble and easily washed out from the precipitate. Before converting the mixed carbonates to the oxides, it may be found desirable to subject the washed precipitate to a preliminary drying at a temperature of about 90° to 100° C. over a period of 10 to 20 hours approximately.

In carrying out a hydrogenation using the mixture of black oxides as first obtained by decomposition of the carbonates, an induction period may be observed. Where the hydrogenation is to be carried out in a continuous-type process, it may be advantageous to give the catalyst a preliminary activation. For instance, the catalyst may be activated by heating it with dry ethyl benzene under hydrogen pressure. Other methods of activation include heating the catalyst in an atmosphere of hydrogen alone. In activating the catalyst, it is desirable that the heating be carried out at a temperature which is usually about 150° to 200° C., although higher and lower temperatures may also be used.

Oxide mixtures in which the copper and chromium are present in an amount from about 9 to 15 parts of chromium per 100 parts of copper are superior catalysts, and are preferred. The preferred catalyst upon activation gives a maximum rate of hydrogenation which is considerably higher than that attainable with catalysts outside the preferred range; and retains its maximum activity over a longer period. The rate of hydrogenation decreases in the direction of both lower and higher chromium content outside the preferred range but it decreases more sharply in the direction of the lower concentration than the higher. The ease of activation appears to increase with increasing chromium content within the limits of the chromium-copper proportions of the present invention. Additionally, catalysts of the preferred proportions may be activated without becoming pyrophoric, and these non-pyrophoric activated catalysts have the advantage that they are less hazardous for large scale commercial operations than a pyrophoric catalyst.

The invention may be further illustrated by the following examples:

Example 1

A precipitate of the mixed carbonates of copper and chromium was formed by adding an aqueous solution of ammonium carbonate monohydrate, $(NH_4)_2CO_3.H_2O$, containing 175 grams of the ammonium salt in one liter of water, to an aqueous solution of copper nitrate trihydrate, $Cu(NO_3)_2.3H_2O$ and chromic nitrate nonahydrate, $Cr(NO_3)_3.9H_2O$, containing 244 grams of the copper salt and 53 grams of the chromium salt in one liter of water. The solution was well stirred during the addition, which required 20 minutes, and for 20 minutes thereafter. The precipitate of mixed carbonates was separated from the liquid by filtration and washed with 1.5 liters of water. The washed precipitate was then agitated with two 500 milliliter portions of water, in succession, each agitation step being followed by filtration and further washing. The material thus obtained amounted to 96 grams after it had been dried in an oven at a temperature of 90° C. for 16 hours. Finally, the dried material was heated at a temperature of 280° to 300° C. for twenty minutes, after it first had been brought up to a temperature of 280° C., while being agitated, over a period of 20 minutes. There were produced 72 grams of black mixed oxides which were found by analysis to have a chromium-copper ratio of 13.8 parts chromium to 100 parts copper, by weight.

Example 2

To 48 grams of a mixture containing 90 per cent phenyl methyl carbinol and 10 per cent acetophenone were added 4.8 grams of the same black mixed oxides described in Example 1. The mixture was then heated under a reflux condenser by means of an oil bath maintained at a temperature of about 175° C. When the temperature of the mixture reached 170° C., a small volume of hydrogen (about 1 to 2 liters) was evolved. Thereafter, the temperature dropped gradually, as a small quantity of water was formed, until it had reached about 140° C. The entire heating period was about one hour. The black mixed oxides were then recovered by filtering, and washed with acetone. There was obtained about 4.6 grams of non-pyrophoric activated catalyst.

*Example 3*

A solution consisting of 81 grams of soda ash dissolved in 2 liters of water was added gradually over a period of 50 minutes to a well-stirred solution made by dissolving 121 grams of copper nitrate trihydrate, $Cu(NO_3)_2 \cdot 3H_2O$, and 26 grams of chromium nitrate nonahydrate, $Cr(NO_3)_3 \cdot 9H_2O$, in 2 liters of water. The stirring was continued 20 minutes after the addition had been completed. A precipitate formed, which was a mixture of the copper carbonate and chromium carbonate, and from this point on the treatment of the precipitate was according to the procedure described in Example 1. There was obtained 47 grams of black mixed oxides in which the metals were present in the proportion of 9.8 parts chromium to 100 parts copper, by weight.

A part of the black mixed oxides thus obtained was activated according to the procedure of Example 2 to yield a non-pyrophoric activated catalyst.

*Example 4*

A mixed oxides catalyst containing copper and chromium in the proportion of 23 parts chromium to 100 parts copper, by weight, was prepared by the method described in Example 1, using 212 grams of copper nitrate trihydrate, 79 grams of chromium nitrate nonahydrate and 170 grams of ammonium carbonate monohydrate. The resulting black mixed oxide catalyst thus obtained was slightly less active than the catalyst of Example 1.

*Example 5*

A part of the black mixed oxides catalyst of Example 4 containing copper and chromium in the ratio of 23 parts chromium to 100 parts copper by weight was activated by the procedure described in Example 2. The activated catalyst was not pyrophoric.

*Example 6*

Black mixed oxides catalyst, prepared as described in Example 1 and containing copper and chromium in the ratio of 13.8 parts chromium to 100 parts copper, by weight, was heated by placing it in a U-tube which was, in turn, immersed in an oil bath. The oil bath was maintained at a temperature of 160° C. and hydrogen passed slowly through the tube for six hours. During the first two hours water was produced. The catalyst thus activated was found to be pyrophoric.

*Example 7*

Black mixed oxides catalyst made by the method of Example 1 and containing copper and chromium in the proportion of 100 parts copper to 13.8 parts chromium, was mixed with dry ethyl benzene in the ratio of 10 parts catalyst to 360 parts ethyl benzene. The mixture was then heated in a pressure reactor to a temperature of 150° C. and hydrogen introduced under a pressure of 60 to 65 pounds per square inch. The pressure was released at one-half hourly intervals to allow the hydrogen to sweep out the small amount of water formed in the partial reduction of the catalyst, and again restored by the introduction of hydrogen. At the end of three hours the catalyst was recovered by filtration and washed with acetone. The catalyst, thus activated, was found to be non-pyrophoric.

We claim:

1. A copper-chromium mixed oxides hydrogenation catalyst in which the chromium is present in a ratio, computed on a metal basis, from about 9 to 15 parts chromium per 100 parts copper, by weight.

2. An activated copper-chromium mixed oxides catalyst in which the chromium is present in a ratio, computed on a metal basis, from about 9 to 15 parts chromium per 100 parts copper, by weight.

DONALD M. YOUNG.
FRANK G. YOUNG, Jr.
HOWARD R. GUEST.

REFERENCES CITED

The following references are of record in the file of this patent:

UNITED STATES PATENTS

| Number | Name | Date |
|---|---|---|
| 1,416,859 | Montonna | May 23, 1922 |
| 1,889,672 | Larson | Nov. 29, 1932 |
| 1,959,313 | Vail | May 15, 1934 |
| 2,040,913 | Amend | May 19, 1936 |
| 2,061,470 | Larson | Nov. 17, 1936 |
| 2,071,704 | Normann | Feb. 23, 1937 |
| 2,091,800 | Adkins | Aug. 31, 1937 |
| 2,105,664 | Lazier | Jan. 18, 1938 |
| 2,118,001 | Andrews | May 17, 1938 |
| 2,217,865 | Groll | Oct. 15, 1940 |
| 2,247,820 | Ruthruff | July 1, 1941 |
| 2,258,111 | Engel | Oct. 7, 1941 |
| 2,275,181 | Ipatieff et al. | Mar. 3, 1942 |
| 2,372,084 | Jones | Mar. 20, 1945 |